(12) United States Patent
Kühnle et al.

(10) Patent No.: US 9,631,696 B2
(45) Date of Patent: Apr. 25, 2017

(54) CENTRIFUGAL FORCE PENDULUM

(71) Applicant: Schaeffler Technologies GmbH & Co. KG, Herzogenaurach (DE)

(72) Inventors: Michael Kühnle, Bühl (DE); David Schnädelbach, Baden-Baden-Neuweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 261 days.

(21) Appl. No.: 14/356,468

(22) PCT Filed: Oct. 31, 2012

(86) PCT No.: PCT/DE2012/001050
§ 371 (c)(1),
(2) Date: May 6, 2014

(87) PCT Pub. No.: WO2013/079042
PCT Pub. Date: Jun. 6, 2013

(65) Prior Publication Data
US 2015/0101450 A1    Apr. 16, 2015

(30) Foreign Application Priority Data

Nov. 28, 2011 (DE) .......................... 10 2011 087 238

(51) Int. Cl.
*F16F 15/14* (2006.01)
(52) U.S. Cl.
CPC ......... *F16F 15/145* (2013.01); *Y10T 74/2128* (2015.01)
(58) Field of Classification Search
CPC ...... F16F 15/145; F16F 15/14; F16F 15/1407; F16F 15/10; F16F 15/1315; F16F 15/131; F16F 15/1414; F16F 15/1428; F16F 15/1464; F16F 15/31; F16F 15/315; F16F 15/3156; F16F 15/3153; Y10T 74/2128; Y10T 74/2131; Y10T 74/2121;
(Continued)

(56) References Cited

U.S. PATENT DOCUMENTS 2,343,421 A  *  3/1944  Porter ..................... F16F 15/14
                                              74/574.3
5,884,740 A  *  3/1999  Sudau ..................... F16D 13/71
                                              192/213.12
(Continued)

FOREIGN PATENT DOCUMENTS

DE    102004011830    9/2004
DE    102009042825    5/2010
(Continued)

OTHER PUBLICATIONS

Machine translation of DE 102010049930.*
Machine translation of DE 102010034812.*

*Primary Examiner* — Adam D Rogers
(74) *Attorney, Agent, or Firm* — Kevin L. Parks

(57) ABSTRACT

The invention relates to a centrifugal force pendulum (100) for suppressing torsional oscillations in a drive train, comprising a first and a second flange (105, 110) that are non-rotatably connected to the drive train and a first and a second pendulum mass (125, 135) that are arranged axially offset between the flanges. The pendulum masses have different suppressing frequencies.

16 Claims, 3 Drawing Sheets

(58) Field of Classification Search
CPC ............. Y10T 74/2126; Y10T 74/2117; Y10T 74/2119; Y10T 74/2132; B60K 6/105
USPC ............................... 74/574.2, 573.13, 572.2
See application file for complete search history.

(56) References Cited

U.S. PATENT DOCUMENTS

| | | | | |
|---|---|---|---|---|
| 8,146,457 | B2* | 4/2012 | Wright | F16F 15/145 |
| | | | | 74/572.2 |
| 8,708,117 | B2* | 4/2014 | Huegel | F16F 15/145 |
| | | | | 192/213 |
| 2011/0179782 | A1* | 7/2011 | Huegel | F16F 15/13128 |
| | | | | 60/338 |
| 2012/0325609 | A1 | 12/2012 | Huegel | |
| 2015/0316124 | A1* | 11/2015 | Wirachowski | F16F 15/145 |
| | | | | 464/51 |

FOREIGN PATENT DOCUMENTS

| | | | | |
|---|---|---|---|---|
| DE | 102009052055 | | 10/2010 | |
| DE | 102010034812 | A1 * | 3/2011 | ............ F16F 15/145 |
| DE | 102010049930 | | 5/2011 | |
| DE | EP 2853772 | A1 * | 4/2015 | ............ F16F 15/145 |
| DE | 102014207962 | A1 * | 10/2015 | ............ F16F 15/145 |
| DE | EP 2949964 | A1 * | 12/2015 | ............ F16F 15/145 |
| DE | 102014220096 | A1 * | 4/2016 | ............... F16D 3/12 |
| DE | 102014223440 | A1 * | 5/2016 | .............. F16F 15/14 |
| FR | 1000629 | | 2/1952 | |
| WO | 2011/110146 | | 9/2011 | |
| WO | 2013/079042 | | 6/2013 | |

\* cited by examiner

CENTRIFUGAL FORCE PENDULUM

CROSS-REFERENCE TO RELATED APPLICATIONS

The present application is the U.S. national stage application pursuant to 35 U.S.C. §371 of International Application No. PCT/DE2012/001050, filed Oct. 31, 2012, which application claims priority to German Application No. 10 2011 087 238.8, filed Nov. 28, 2011.

FIELD

The invention relates generally to a centrifugal force pendulum. In particular, the invention relates to a centrifugal force pendulum for suppressing torsional oscillations in a drivetrain of a motor vehicle.

BACKGROUND

During the transfer of a torque, in particular in a drivetrain between a drive engine and a transmission of a motor vehicle, different complex torsional oscillation dampers are used to isolate or suppress occurring torsional oscillations. A known measure for degrading such oscillations is the use of a centrifugal force pendulum. A centrifugal force pendulum comprises a flange that is coupled to a shaft in the drivetrain and with a number of pendulum masses that are shiftably arranged on a circumference of the flange. Tracks along which the pendulum masses can shift relative to the flange are selected in such a manner that that the pendulum masses act as short-time energy stores in order to suppress torsional oscillation in the drive train.

A centrifugal force pendulum is an oscillatory system that has a predetermined resonance frequency. The suppression of torsional oscillations is great in the area of the resonance frequency and drops off in the direction of higher and lower frequencies of the torsional oscillations.

A torque transfer device with a centrifugal force pendulum is known from German Patent No. 10 2009 042 825 A1. The pendulum masses are located in pairs on different sides of the flange and are coupled to each other by a bolt.

A similar arrangement is shown in German Patent No. 10 2009 052 055 A1, whereby different pendulum masses with different resonance frequencies are arranged along a circumference of the flange in order to coordinate the suppression behavior of the centrifugal pendulum with different operating states of an internal combustion engine.

A centrifugal force pendulum is shown in German Patent No. 10 2011 011 469 in which the pendulum masses are located between two flanges that are offset in the axial direction.

In order to be able to effectively suppress oscillations, for example, in a reciprocating internal combustion engine with a small number of cylinders, it is desirable to be able to coordinate a centrifugal force pendulum with several different resonance frequencies. Here, the centrifugal force pendulum should be built up compactly and be as wear-resistant as possible.

BRIEF SUMMARY

A centrifugal force pendulum for the suppression of torsional oscillations in a drivetrain, in particular of a motor vehicle, comprises a first and a second flange that are non-rotatably connected to the drivetrain, and comprises a first and the second pendulum mass that are arranged axially offset between the flanges. The pendulum masses have different suppression frequencies.

The suppression frequencies concern primarily resonance frequencies of the pendulum masses and secondarily a damping course outside of the resonance frequencies. It is possible by using pendulum masses with different suppression frequencies to adapt the centrifugal force pendulum in an improved manner to an operating behavior of a drive engine, in particular of a reciprocating internal combustion engine. For example, an internal combustion engine with selective cylinder cutoff in which different numbers of cylinders are active in different operating states can be influenced in its torsional oscillation behavior in an improved manner by the centrifugal force pendulum. A compact centrifugal force pendulum with low axial and radial structural space requirements is produced by the axial arrangement of the pendulum masses.

The different suppression frequencies are, for example, set by different pendulum paths of the pendulum masses. The suppression frequencies can be precisely coordinated with an internal combustion engine used and with its operating states by suitably designing the pendulum tracks, for example, as epicycloids or circular tracks. A mass manufacturing of such pendulum masses and of the resulting centrifugal force pendulum can also be facilitated in this manner.

In another embodiment a pendulum shaft attached to the flanges runs in axial direction through apertures of both pendulum masses. In order to fix different pendulum tracks the apertures of the pendulum masses can be differently formed. As a result, a common support of the pendulum masses can be combined with a simple variation of the pendulum tracks and therefore of the suppression frequencies of the individual pendulum masses.

Additionally or alternatively, in order to fix different pendulum tracks, active diameters of the pendulum shaft on the pendulum masses can be different. As a result, the apertures in the pendulum masses can be the same, if necessary, whereas different pendulum tracks and therefore different suppression frequencies are nevertheless achieved. The same pendulum masses can be multiply used, so that manufacturing costs can be lowered.

In an embodiment roller bearings are arranged between the pendulum shaft and the pendulum masses, whereby the roller bearings have different outside diameters. The variation of the active diameters of the pendulum shaft can be realized in a simple manner as a consequence. In particular, the roller bearings can have the same inside diameter so that the pendulum shaft can be cylindrically formed in the area of the roller bearings. As a result, a manufacturing of the individual parts of the centrifugal force pendulum as well as a mounting can be simplified, whereby costs can be saved.

In another embodiment the pendulum masses can have different masses in order to fix different suppression frequencies. In particular, the pendulum masses can be manufactured from a level, flat material, for example, a sheet, and can comprise different contours in a radial direction. As a consequence the suppression frequency of each pendulum mass can be readily influenced.

In order to fix different suppression frequencies, centers of gravity of the pendulum masses can also have different positions. The positions of the centers of gravity, in particular in the radial direction, can be varied, for example, by the position of the apertures.

In an embodiment the first pendulum mass comprises two separate pendulum weights that are arranged axially on different sides of the second pendulum mass. As a result, the mass of the first pendulum mass can be enlarged relative to the mass of the second pendulum mass while at the same time a symmetric distribution of forces can take place in the axial direction. The introduction of forces from the pendulum masses into the flanges by the pendulum shaft, in particular in the case of resonance, can be improved by this arrangement.

In an embodiment three or more pendulum masses with different suppression frequencies are provided. As regards the number of pendulum masses there are theoretically no limitations and four or more axially offset pendulum masses can also be arranged between the flanges. In an embodiment pendulum masses can also be arranged axially outside of the flanges. Here, pendulum masses opposite each other, for example, act as a common pendulum mass in that they have the same suppression frequencies. Furthermore, the suppression frequency of the third pendulum masses, for example, differs from the suppression frequencies of the first and second pendulum masses.

In an embodiment a fixing device is provided for the switchable coupling of the first pendulum mass to the second pendulum mass. As a result, the suppression behavior of the centrifugal force pendulum can be adapted, for example, in a purposeful manner to the number of cylinders of an internal combustion engine that are in operation.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 2:
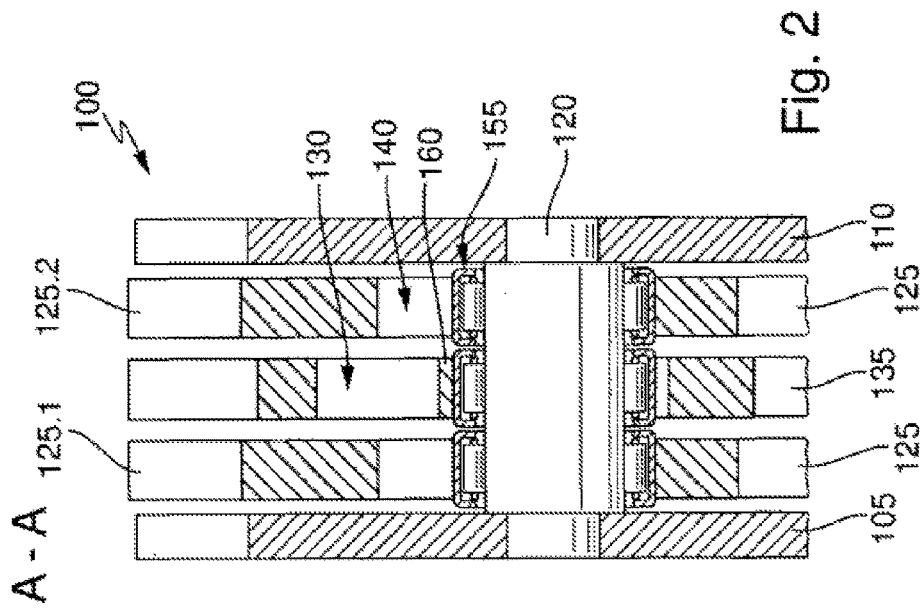
FIG. 2 shows a sectional view of the centrifugal force pendulum of FIG. 1.
Figure 1:
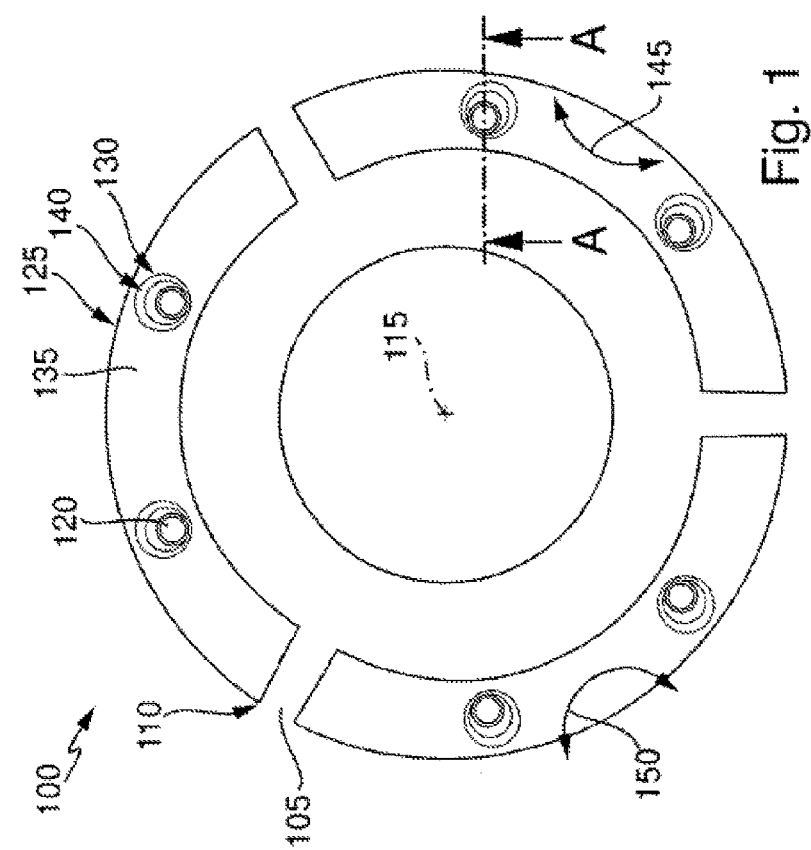
FIG. 1 shows an axial view of a centrifugal force pendulum.
Figure 3:
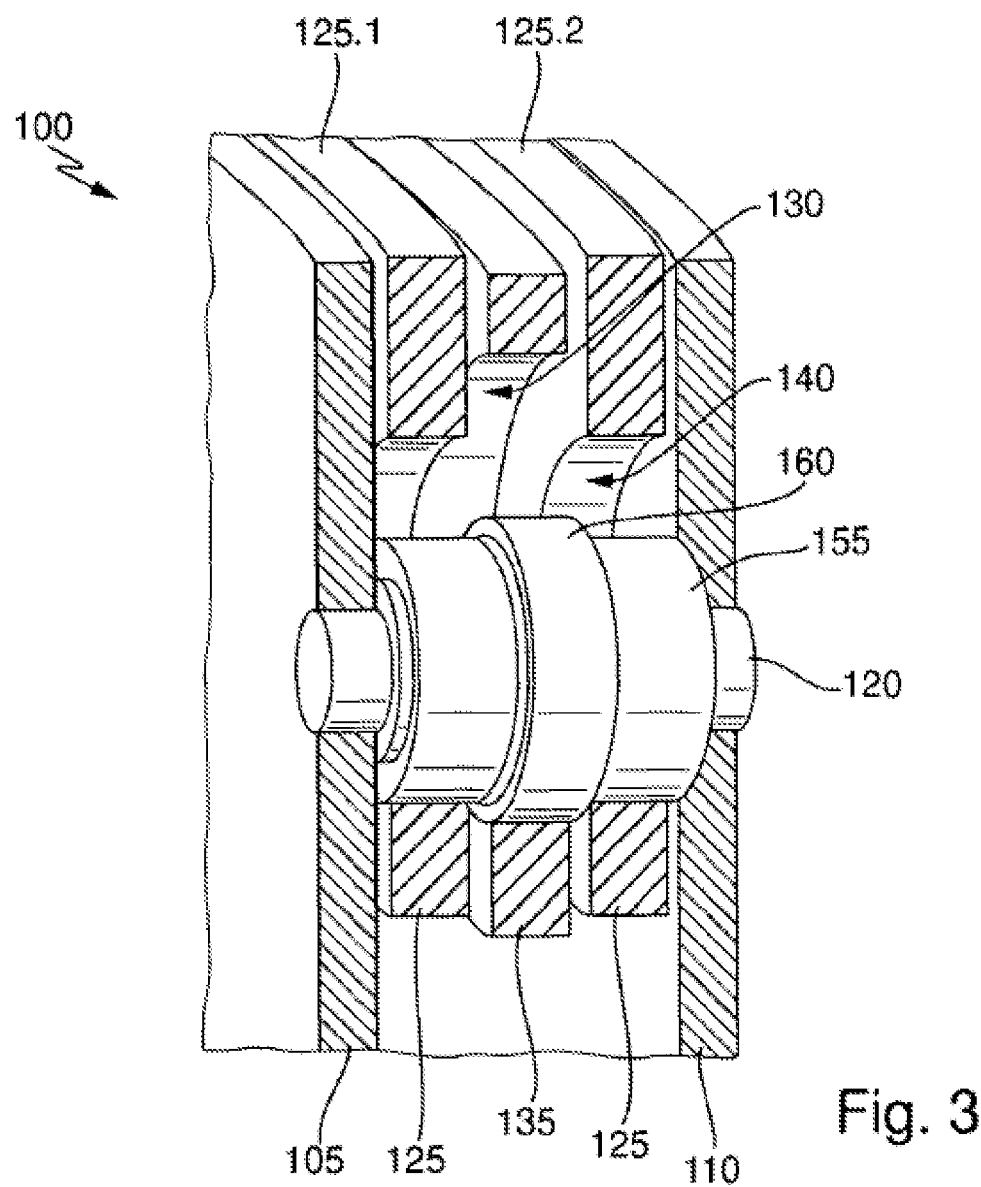
FIG. 3 shows a perspective view of the section from FIG. 2.

The following description is made with reference to FIGS. 1-3. FIG. 1 shows an axial view of centrifugal force pendulum 100. Centrifugal force pendulum 100 comprises first flange 105 and second flange 110 that are arranged in such a manner that they can rotate about axis of rotation 115. Second flange 110 is not shown for the sake of a better understanding in FIG. 1. Flanges 105 and 110 are rigidly connected to each other by pendulum shafts 120. Pendulum shafts 120, for example, lie on a common circumference about axis of rotation 115.

First pendulum masses 125 including apertures 140 and second pendulum masses 135 including apertures 130 are attached in an axially offset manner so that pendulum shaft 120 runs through apertures 130 and 140. This results in three stacks of pendulum masses 125, 135 uniformly distributed on the circumference of the pendulum shafts 120 about the axis of rotation 115. In FIG. 1 a section 125.1 of first pendulum mass 125 and facing the observer is not shown (cf. FIG. 2).

The shapes of apertures 130, 140 determine together with the effective diameters of pendulum shafts 120 a pendulum path for first pendulum mass 125 and second pendulum mass 135. A first, circular pendulum track 145 and a second, epicyclical pendulum track 150 are sketched in by way of example. In different embodiments pendulum tracks 145, 150 can also be fixed in such a manner that pendulum masses 125, 135 rotate about their own axis during deflection along associated pendulum track 145, 150, thus saving additional energy. Such an embodiment is known under the designation trapezoidal pendulum. In the embodiment shown in FIG. 1 pendulum masses 125, 135 are suspended in a bifilar manner but a unifilar suspension is also possible. The number of pendulum shafts 120 and corresponding apertures 130, 140 is not limited to two.

Centers of gravity of pendulum masses 125 and 135 can have different positions, in particular in the radial direction relative to pendulum masses 125, 135. The positions of the centers of gravity can be influenced in particular by the placement of apertures 130 and 140.

FIG. 2 shows a sectional view of the centrifugal force pendulum 100 of FIG. 1 in which the section takes place along section line A-A sketched into FIG. 1.

Pendulum shaft 120 is cylindrical in a graduated manner between first flange 105 and second flange 110. End sections of pendulum shaft 120 have smaller diameters than a middle section. End sections run through corresponding apertures in flanges 105 and 110 and can be caulked, riveted, welded or fastened in some other known manner on flanges 105, 110 for security.

Needle bearings 155 are attached to pendulum shaft 120 in order to guide pendulum masses 125, 135 with low friction on pendulum tracks 145, 150. Needle bearing 155 includes spacer 160 radially on the outside so that an effective diameter of pendulum shaft 120 is enlarged in this region. Alternatively or additionally, the effective diameter can also be formed, for example, by an enlarged cage of needle bearing 155, roller bodies with larger diameters or in some other way. Pendulum track 145, 150 can be influenced by the variation of the effective diameter, as a result of which the suppression frequency of pendulum mass 125, 135 is influenced.

In an example aspect, first pendulum mass 125 is divided into first pendulum weight 125.1 and second pendulum weight 125.2. Pendulum weights 125.1 and 125.2 lie in the axial direction on different sides relative to second pendulum mass 135. Individual pendulum weights 125.1 and 125.2, for example, have identical suppression frequencies. This can be achieved in particular in that the material, the shape and the position of pendulum weights 125.1 and 125.2 as well as the shape, size and position of apertures 140 and the effective diameters of pendulum shaft 120 in the area of the pendulum weights 125.1 and 125.2 are identical. An additional mechanical coupling of pendulum weights 125.1 and 125.2 is then no longer required but can be made for the improved synchronization of the suppression frequencies, for example, by an axial rivet.

The suppression frequencies of pendulum masses 125 and 135 are differently selected. Each suppression frequency is formed by a resonance frequency of the particular pendulum mass 125, 135 and by a damping course in the direction of higher and lower frequencies. In an example aspect, the suppression frequencies of pendulum masses 125, 135 overlap only slightly or not at all and cover torsional oscillations that, for example, occur in different operating states of a drive engine driving centrifugal force pendulum 100. The drive engine can be in particular a reciprocating internal combustion engine with selective cylinder disengagement. In an example aspect, different numbers of pistons can be used to generate torque as a function of the internal combustion engine, as a result of which frequencies of torsional oscillations emanating from the drive engine are different in frequency and in amplitude.

FIG. 3 shows a perspective view of the section of FIG. 2.

Centrifugal force pendulum 100 also has different suppression frequencies by designing pendulum masses 125, 135 according to different suppression frequencies. One of pendulum masses 125, 135 can be fastened on flanges 105, 110 for an improved adaptation of the suppression frequencies of centrifugal force pendulum 100 to torsional oscillations of the drive engine to be expected while the drive engine is in a first operating state and released when the drive engine is in a second operating state. The different operating states can comprise different numbers of active cylinders.

Figure 4:
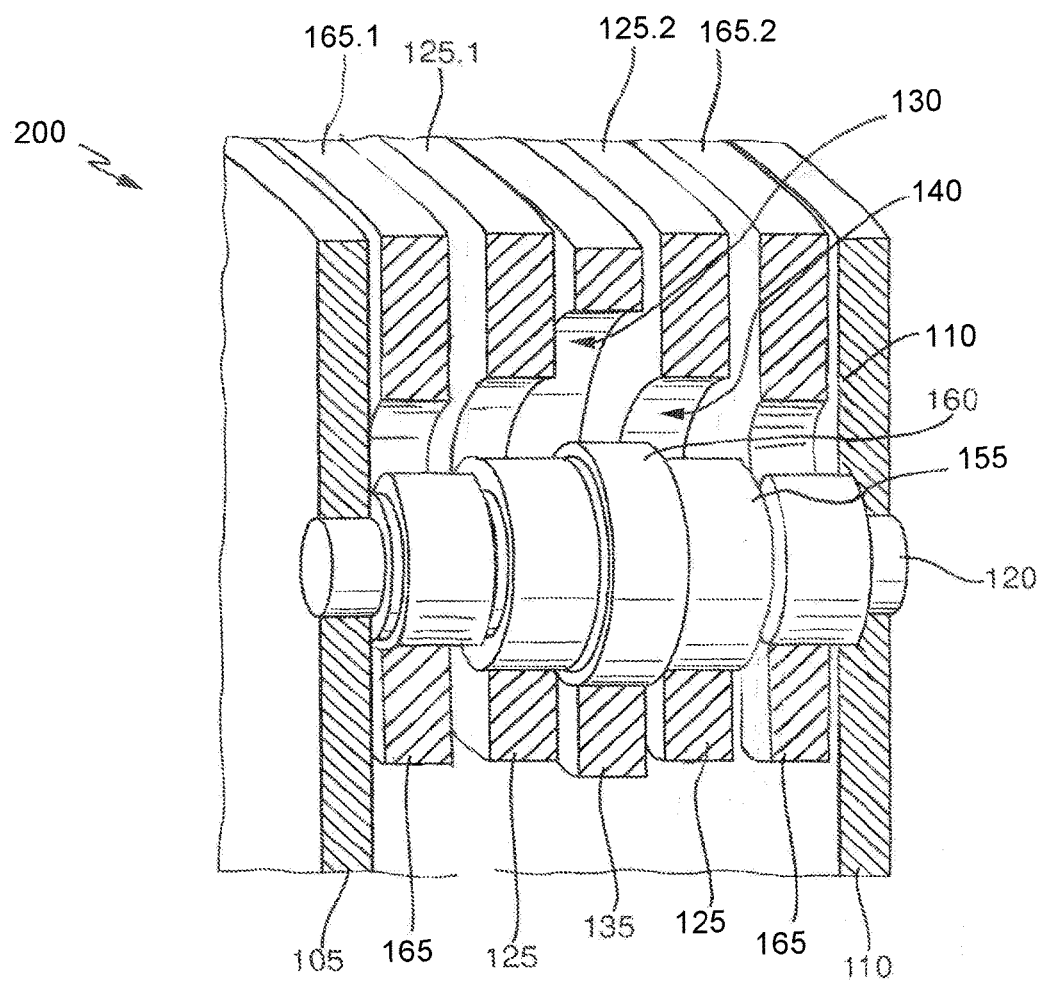
FIG. 4 shows a perspective view of an alternative embodiment of the pendulum of FIG. 1.

FIG. 4 shows a perspective view of alternative embodiment 200 with more than two pendulum masses 125, 135. A pendulum mass 165 can be arranged between flanges 105, 110. Third pendulum mass 165 is, for example, divided into two separate pendulum weights 165.1 and 165.2 that are arranged in mirror symmetry to the second pendulum mass 135 in a manner similar to the pendulum weights 125.1 and 125.2 of the first pendulum mass 125.

In another embodiment pendulum weights 165.1 and 165.2 are arranged axially outside of flanges 105 and 110. The support of all pendulum masses 125, 135, 165, for example, takes place by pendulum shafts 120.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

LIST OF REFERENCE NUMERALS

100 centrifugal force pendulum
105 first flange
110 second flange
115 axis of rotation
120 pendulum shaft
125 first pendulum mass
125.1 first pendulum weight of the first pendulum mass 125
125.2 second pendulum weight of the first pendulum mass 125
130 aperture of the second pendulum mass 135
135 second pendulum mass
140 aperture of the first pendulum mass 125
145 first pendulum track (in the shape of a circular arc)
150 second pendulum track (epicyclical)
155 needle bearing
160 spacer
165 third pendulum mass
165.1 first pendulum weight of the third pendulum mass 165
165.2 second pendulum weight of the third pendulum mass 165

What we claim is:

1. A centrifugal force pendulum for suppressing torsional oscillations in a motor vehicle, the centrifugal force pendulum comprising:
   a first flange and a second flange;
   a first pendulum mass and a second pendulum mass arranged in an axially offset manner between and supported by a pendulum shaft extending between the first and second flanges, wherein:
   the first and second pendulum masses have respective unequal suppression frequencies; and
   the first pendulum mass is a single mass and the second pendulum mass is a pair of masses on opposite axial sides of the first pendulum mass.

2. The centrifugal force pendulum according to claim 1, wherein the unequal suppression frequencies are fixed by an unequal first pendulum track and second pendulum tracks of the first and second pendulum masses, respectively.

3. The centrifugal force pendulum according to claim 2, wherein the first and second pendulum tracks are characterized as epicycloids, circular tracks, or combinations thereof.

4. The centrifugal force pendulum according to claim 3, wherein the first pendulum track is circular and the second pendulum track is epicyclical.

5. The centrifugal force pendulum according to claim 2, wherein:
   the first pendulum mass includes a first aperture having a first diameter; and,
   one of the pair of second pendulum masses includes a second aperture having a second diameter;
   the other of the pair of second pendulum masses includes a third aperture having a third diameter, equal to the second diameter;
   the pendulum shaft is attached to the first and second flanges and is disposed in an axial direction through the first and second apertures; and
   the first aperture is unequally shaped relative to the second aperture and the third aperture.

6. The centrifugal force pendulum according to claim 5, wherein the second aperture diameter is less than the first aperture diameter.

7. The centrifugal force pendulum according to claim 5, wherein the pendulum shaft has a first diameter unequal to a pair of second diameters, and wherein the first diameter aligns with the first aperture and the second diameters align with the second and third apertures.

8. The centrifugal force pendulum according to claim 7 further comprising roller bearings installed on the pendulum shaft and aligned with the first and second unequally shaped apertures, respectively.

9. The centrifugal force pendulum according to claim 1, wherein the first pendulum mass has a first mass and each of the second pendulum masses has a mass, unequal to the first mass, for fixing the unequal first and second suppression frequencies.

10. The centrifugal force pendulum according to claim 1, wherein the first pendulum mass includes a uniquely positioned first center of gravity and each of the second pendulum masses has a uniquely positioned center of gravity, unequal to the first center of gravity, for fixing the unequal first and second suppression frequencies.

11. The centrifugal force pendulum according to claim 1 further comprising a third pendulum mass having a third unequal suppression frequency.

12. The centrifugal force pendulum according to claim 11, wherein the third pendulum mass has a third mass, unequal to the first and second masses, for fixing the third unequal suppression frequency.

13. The centrifugal force pendulum according to claim 11, wherein the third pendulum mass comprises third and fourth individual mass elements.

14. The centrifugal force pendulum according to claim 13, wherein the third and fourth individual mass elements are arranged axially between the first and second flanges.

15. A centrifugal force pendulum assembly for a vehicle drivetrain comprising:
   a first pendulum mass including a first aperture and a first suppression frequency;
   a pair of second pendulum masses on opposite axial sides of the first pendulum mass, each including a second aperture and a second suppression frequency, unique relative to the first suppression frequency;
   a first flange and a second flange on axially opposite sides of the pair of second pendulum masses; and
   a pendulum shaft installed in each of the first and second flanges and passing through the first and second apertures for supporting the first pendulum mass and the pair of second pendulum masses.

16. The centrifugal force pendulum assembly of claim 15 wherein the the pendulum shaft has a first diameter unequal to a second diameter, and wherein the first diameter aligns with the first aperture and the second diameter aligns with the second aperture.

\* \* \* \* \*